March 24, 1970 M. L. HIRSCHHORN 3,502,080

THERMOELECTRICALLY COOLED SURGICAL INSTRUMENT

Filed June 28, 1965

INVENTOR.
MAX L. HIRSCHHORN
BY
Brokin & Goldfarb
ATTORNEYS

United States Patent Office 3,502,080

Patented Mar. 24, 1970

3,502,080

THERMOELECTRICALLY COOLED SURGICAL INSTRUMENT

Max L. Hirschhorn, 5601 13th Ave., Brooklyn, N.Y. 11235

Filed June 28, 1965, Ser. No. 467,781
Int. Cl. A61b *17/36;* A61f *7/00*
U.S. Cl. 128—303.1 6 Claims

ABSTRACT OF THE DISCLOSURE

A surgical instrument comprising a heat conductive body having Peltier cells disposed on opposite sides of the body with their cool junctions adjacent to and electrically insulated from the body. Means are provided connecting the Peltier cells to a source of direct current and cooling fluid conduits are disposed on opposite sides of the body adjacent the hot junctions of the cells and handle means are disposed about the conduits holding the body, the cells and the conduits in an assembled relationship and a secondary Peltier cell having a cold junction facing said operating portion and a hot junction in heat conductor relation to said body.

The present invention relates to surgical instruments and more particularly to a thermoelectrically cooled surgical instrument of the type disclosed in my U.S. Patent No. 3,093,135, issued June 11, 1963, for "Cooled Surgical Instrument."

Surgical instruments employing thermoelectric means for cooling operating tool surfaces are being utilized in surgical procedures to a greater and greater degree. Various types of scalpels, knives, probes, biopsy scoops and other instruments have been devised which are provided with means for cooling the tool surfaces thereof so as to produce controlled cooling and freezing of live tissues during surgery and thereby lessening the tendency to shock and hemorrhage by reducing the flow of blood, lessening of pain and destroying, by controlled freezing, of such tissue as may be necessary for the health of the patient.

In carrying out the present invention, a surgical instrument is provided, which has a body in the form of a block cooled by at least one Peltier cell being disposed with its cold junction adjacent to and electrically insulated from the body. The hot junction is cooled through the use of liquid cooling conduits. A tool such as a scalpel, knife, probe, biopsy scoop or other instrument is disposed adjoining and in heat conductive relationship with the body. One of the important features of the present invention is the utilization of handle means disposed about the conduits so that the body, the Peltier cell and the conduits are held in an assembled relationship.

It is an object of the present invention to provide a thermoelectrically cooled surgical instrument which has an operating tool surface substantially below 32° F. and which is so constructed as to be of a relatively small and easily wielded size and which is compact and effective.

A further object of the present invention resides in the provision of a thermoelectrically cooled surgical instrument which has means disposed within the operating tool for cooling the cutting or operating tool surface to a considerable extent so as to reduce flow of blood and/or coagulate the blood and minimize pain and shock.

A further object of the present invention resides in the provision of a surgical instrument that is provided with a suitable coating about substantially the entire surface thereof of a polyurethane foam or the like so as to render the entire device easily sterilized and which has an operating tool provided with a suitable ceramic coating for reducing adherence to body cells as the tool is utilized to cut or probe or the like.

Still further objects and features of this invention reside in the provision of a thermoelectrically cooled surgical instrument that is strong and durable, comparatively simple in construction and manufacture, and capable of various uses in modern-day surgical techniques, to facilitate the performing of difficult operations on the brain, kidneys, eyes, heart and the like, and thus increases the possibility of survival of the patient.

These, together with the various ancillary objects and features of this invention, which will become apparent as the following description proceeds, are attained by this thermoelectrically cooled surgical instrument, a preferred embodiment of which is shown in the accompanying drawings, by way of example only, wherein.

Figure 1:
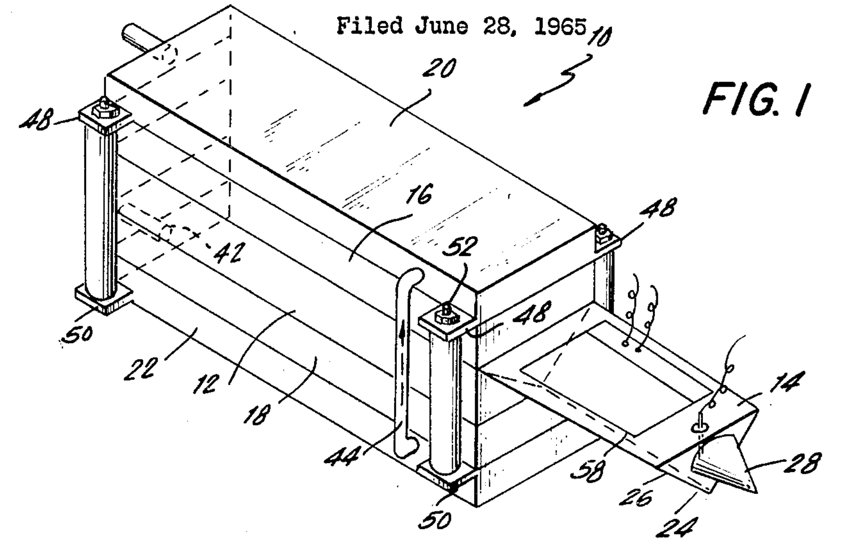
FIG. 1 is a perspective view of a surgical instrument constructed in accordance with the concepts of the present invention.
Figure 2:
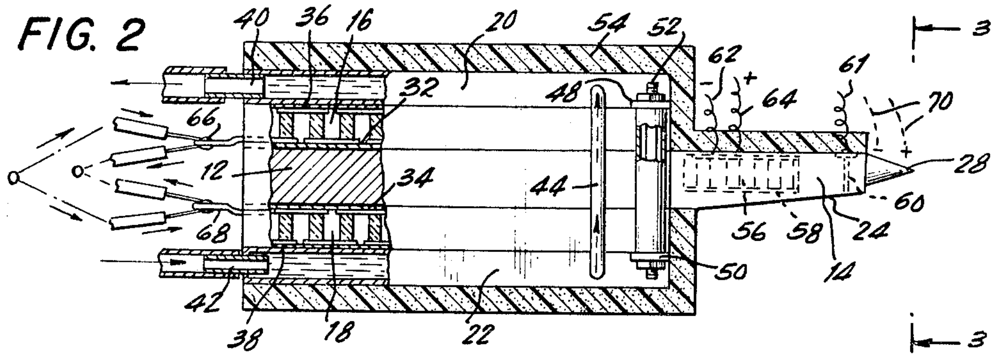
FIG. 2 is a longitudinal sectional view of the thermoelectrically cooled surgical instrument.
Figure 3:
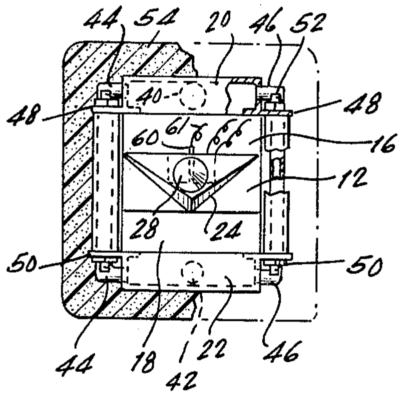
FIG. 3 is an end elevational view looking in the direction of the arrows 3—3 in FIG. 1 with portions of the surgical instrument being broken away to show details of construction.
Figure 4:
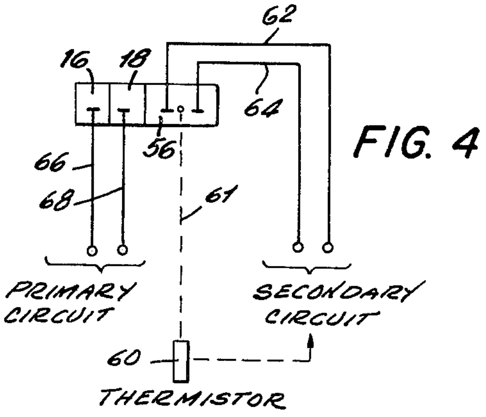
FIG. 4 is a schematic wiring line diagram of electrical components of the invention.
Figure 5:
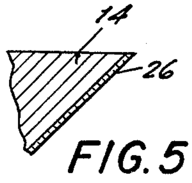
FIG. 5 is a sectional detail view illustrating the ceramic coat applied to the operative surface of the tool.

With continuing reference to the accompanying drawings wherein like reference numerals designate similar parts throughout the various views, reference numeral 10 generally designates an embodiment of the surgical instrument in accordance with the concepts of the present invention. The surgical instrument 10 includes a body 12 formed of stainless steel having a tool 14 either integrally formed therewith or secured thereto in heat conductive relationship therewith. Preferably, the tool 14 is formed as an integral extension of the body 12. Disposed on opposite sides of the body 12 are Peltier cells 16 and 18 and disposed on opposite sides of the body 12 are conduit assemblies 20 and 22.

The tool 14 is preferably provided with a cutting edge 24 and has the cutting surfaces thereof provided with a ceramic coating 26 so as to delay or prevent icing due to freezing of condensing moisture on the cooled or freezing surfaces of the cutting edge. The ceramic used is formed with the cutting edge. The tool 14 is provided with a conical metallic projection 28, which is electrically connected so as to be positively charged.

The Peltier cells 16 and 18 are of a relatively small size and are immediately adjacent to and electrically insulated from the body 12. The insulation used may be electrically insulated grease, mica, or any relatively thin and satisfactory electrical insulator. The Peltier cells are disposed with their cold junctions 32 and 34 directed towards the body 12 and with their hot junctions 36 and 38 facing outwardly and in the direction of the conduit assemblies 20 and 22. The conduit assemblies include preferably pairs of conduits 40 and 42 for a cooling liquid such as water or the like. These pairs of cooling conduits 40 and 42 are interconnected to each other by suitable tubes 44 and 46. In order to provide equal cooling for the hot junctions 38, the inlet tubes 42 have lesser diameter than the outlet tubes 40.

Preferably integrally formed with the cooling fluid conduit assemblies 20 and 22 are sets of ears 48 and 50, which are secured together by bolts 52 serving as part of the handle constructions for holding the body, the Peltier cells 16 and 18 and the conduit assemblies 20 and 22 in an assembled relationship. A coating 54 of polyurethane foam is disposed about the body, and the Peltier cells and the conduit assemblies as well as the tubes 44 and 46 and the bolts 52 thereby arriving at an easily grasped handle construction.

A secondary Peltier cell 56 is embedded in a cavity 58 in the tool 14. Likewise, a thermistor 60 or thermal sensing element is connected by suitable electrical conductor means 61 in a manner so as to control flow of electrical current through the electrical conductor 62 and 64 to the secondary Peltier cell 56. Conductors 66 and 68 are provided for providing a direct electrical current to the Peltier cells 16 and 18.

Suitable electrical conductors, as schematically indicated at 70 are provided and connected thereto for electrically positively charging the conical projection 28. When the conical projection 28 is positively charged, it will serve to coagulate blood elements since it has been determined previously that these are negatively charged and aid in reducing blood flow in conjunction with the freezing temperature of the tool surface. It is to be understood that this instrument may be designed with the tool 14 serving as a surgical probe, scalped, knife, or for other surgical purposes and that the ceramic coating 54 will serve to prevent or delay any icing due to freezing or condensed moisture thereon. The surgical instrument 10 is extremely advantageous for use in surgical procedures on the heart, kidneys, brain, cancerous tissue which notoriously bleeds profusely or for the removal of cataracts or other ophthalmic surgical procedures.

A latitude of modification, substitution and change is intended in the foregoing disclosure, and in some instances some features of the invention will be employed without the corresponding use of other features. Accordingly, it is appropriate that the appended claims be construed broadly and in a manner consistent with the spirit and scope of the invention herein.

I claim:

1. A surgical instrument comprising a heat conductive body having a tool in heat conductive relationship with said body, Peltier cells each having a cold and a hot junction, said cells being disposed on opposite sides of said body with their cold junctions adjacent to and electrically insulated from said body, means adapted to connect said Peltier cells to a source of direct current, cooling liquid conduits disposed against said hot junctions of said cells, means for directing cooling liquid through said conduits, handle means disposed about said conduits holding said body, said cells and said conduits in an assembled relationship, said tool having an operating portion, a secondary Peltier cell having a cold junction facing said operating portion and a hot junction in heat conductive relation to said body, and means adapted to connect said secondary Peltier cell to a source of direct current, said conduits having at least a portion thereof adjacent said secondary Peltier.

2. A surgical instrument according to claim 1, including thermocouple sensor means embedded in said tool adjacent said operating portion for controlling flow of electric current to said secondary Peltier cell.

3. A surgical instrument comprising a heat conductive body having a tool in heat conductive relationship with said body, Peltier cells each having a cold and a hot junction, said cells being disposed on opposite sides of said body with their cold junctions adjacent to and electrically insulated from said body, means adapted to connect said Peltier cells to a source of direct current, cooling liquid conduits disposed against said hot junctions of said cells, means for directing cooling fluid through said conduits, handle means disposed about said conduits holding said body, said cells and said conduits in an assembled relationship, said tool having an operating portion, and a secondary Peltier cell having a cold junction facing said operating portion and a hot junction in heat conductive relation to said body, said tool being provided with a ceramic coating, said handle means, said body, said cells and said conduits being encased in polyurethane foam, said foam being at least part of said handle means, and means adapted to connect said secondary Peltier cell to a source of direct current.

4. A surgical instrument according to claim 1, wherein the conduits on one side of said body are of larger bore than the conduits on the other side thereof.

5. A surgical instrument according to claim 4, including means connecting the conduits on opposite sides of said body for controlling flow of cooling fluid through said conduits.

6. A surgical instrument according to claim 5, wherein said handle means includes an insulation coating of polyurethane, said body, said cells, and said conduits being encased in said insulation coating, said tool having a ceramic coating.

References Cited

UNITED STATES PATENTS

| | | | |
|---|---|---|---|
| 3,093,135 | 6/1963 | Hirschhorn | 128—303.1 |
| 3,133,539 | 5/1964 | Eidus | 128—399 |

WILLIAM E. KAMM, Primary Examiner